(12) United States Patent
Mast et al.

(10) Patent No.: US 7,695,436 B2
(45) Date of Patent: Apr. 13, 2010

(54) TRANSMIT APODIZATION OF AN ULTRASOUND TRANSDUCER ARRAY

(75) Inventors: T. Douglas Mast, Cincinnati, OH (US); Peter G. Barthe, Phoenix, AZ (US); Paul M. Jaeger, Mesa, AZ (US); Waseem Faidi, Clifton Park, NY (US); Stephen P. Leonard, Scottsdale, AZ (US); Michael H. Slayton, Tempe, AZ (US)

(73) Assignee: Ethicon Endo-Surgery, Inc., Cincinnati, OH (US)

( * ) Notice: Subject to any disclaimer, the term of this patent is extended or adjusted under 35 U.S.C. 154(b) by 263 days.

(21) Appl. No.: 10/850,959

(22) Filed: May 21, 2004

(65) Prior Publication Data

US 2005/0261610 A1  Nov. 24, 2005

(51) Int. Cl.
*A61B 8/00* (2006.01)
(52) U.S. Cl. .................. 600/439; 600/407; 600/437
(58) Field of Classification Search ......... 600/407–480, 600/373–386, 508–528; 601/2, 3, 4; 604/22; 606/41, 32, 49, 47; 607/115–116
See application file for complete search history.

(56) References Cited

U.S. PATENT DOCUMENTS

| | | | |
|---|---|---|---|
| 3,168,659 A | 2/1965 | Bayre et al. | |
| 3,902,501 A | 9/1975 | Citron et al. | |
| 3,927,557 A | 12/1975 | Viertl | |
| 4,748,985 A | 6/1988 | Nagasaki | |
| 4,757,820 A | 7/1988 | Itoh | |
| 4,798,215 A | 1/1989 | Turner | |
| 4,844,080 A | 7/1989 | Frass et al. | |
| 4,858,613 A | 8/1989 | Fry et al. | |
| 4,937,767 A | * 6/1990 | Reuschel et al. | ............ 702/124 |
| 4,960,109 A | 10/1990 | Lele | |
| 5,117,832 A | 6/1992 | Sanghvi et al. | |
| 5,238,007 A | 8/1993 | Giele et al. | |
| 5,242,437 A | 9/1993 | Everett et al. | |
| 5,295,484 A | 3/1994 | Marcus et al. | |
| 5,305,731 A | 4/1994 | Buchholtz | |
| 5,348,017 A | 9/1994 | Thornton et al. | |

(Continued)

OTHER PUBLICATIONS

Chavrier et al., "Modeling of high-intensity focused ultrasound-induced lesions in the presence of cavitation bubbles," J. Acoust. Soc. Am. 108(1), pp. 432-440 (Jul. 2000).

Watkins et al., "High-intensity focused ultrasound ablation of the kidney in a large animal model," J. Endourol., 11 (3), 191, abstract (Jun. 1997).

(Continued)

*Primary Examiner*—Brian Casler
*Assistant Examiner*—Nasir Shahrestani
(74) *Attorney, Agent, or Firm*—Verne E. Kreger, Jr.

(57) ABSTRACT

A system for temporal transmit apodization of an ultrasound transducer array. The system includes a waveform generator and an ultrasound transducer array having a plurality of transducer elements. Each of the transducer elements is driven by a signal generator that generates a periodic waveform. The duty cycle of each signal generator is determined by a predetermined setting of a duty cycle control. The duty cycle of each signal generator is calculated to achieve a desired beam profile of the transducer array, such as acoustic focusing for reducing the level of grating lobes and side lobes. Apodization is achieved by varying the effective amplitude at each array element by varying the duty cycle of the signal provided to each element.

16 Claims, 4 Drawing Sheets

U.S. PATENT DOCUMENTS

| | | | |
|---|---|---|---|
| 5,391,197 A | 2/1995 | Burdette et al. | |
| 5,413,550 A | 5/1995 | Castel | |
| 5,419,335 A | 5/1995 | Hartmann et al. | |
| 5,458,597 A | 10/1995 | Edwards et al. | |
| 5,465,724 A | 11/1995 | Sliwa et al. | |
| 5,471,988 A | 12/1995 | Fujio et al. | |
| 5,485,839 A | 1/1996 | Aida et al. | |
| 5,492,126 A | 2/1996 | Hennige et al. | |
| 5,500,012 A | 3/1996 | Brucker et al. | |
| 5,501,655 A | 3/1996 | Rolt et al. | |
| 5,514,085 A | 5/1996 | Yoon | |
| 5,547,459 A * | 8/1996 | Kaufman et al. | 601/2 |
| 5,549,638 A | 8/1996 | Burdette | |
| 5,558,092 A * | 9/1996 | Unger et al. | 600/439 |
| 5,571,088 A | 11/1996 | Lennox et al. | |
| 5,575,288 A | 11/1996 | Sliwa et al. | |
| 5,588,432 A | 12/1996 | Crowley | |
| 5,620,479 A | 4/1997 | Diederich | |
| 5,630,837 A | 5/1997 | Crowley | |
| 5,657,760 A | 8/1997 | Ying et al. | |
| 5,694,936 A | 12/1997 | Fujimoto et al. | |
| 5,715,825 A | 2/1998 | Crowley | |
| 5,728,062 A | 3/1998 | Brisken | |
| 5,733,315 A | 3/1998 | Burdette et al. | |
| 5,735,280 A | 4/1998 | Sherman et al. | |
| 5,759,154 A | 6/1998 | Hoyns | |
| 5,762,066 A | 6/1998 | Law et al. | |
| 5,771,896 A | 6/1998 | Sliwa et al. | |
| 5,800,379 A | 9/1998 | Edwards | |
| 5,820,580 A | 10/1998 | Edwards et al. | |
| 5,842,994 A | 12/1998 | TenHoff et al. | |
| 5,860,974 A | 1/1999 | Abele | |
| 5,876,399 A | 3/1999 | Chia et al. | |
| 5,897,523 A | 4/1999 | Wright et al. | |
| 5,931,848 A | 8/1999 | Saadat | |
| 5,979,453 A | 11/1999 | Savage et al. | |
| 5,997,534 A | 12/1999 | Tu et al. | |
| 6,001,069 A | 12/1999 | Tachibana et al. | |
| 6,004,269 A | 12/1999 | Crowley et al. | |
| 6,007,499 A | 12/1999 | Martin et al. | |
| 6,014,897 A * | 1/2000 | Mo | 73/628 |
| 6,022,319 A | 2/2000 | Willard et al. | |
| 6,027,449 A | 2/2000 | Mezess et al. | |
| 6,106,469 A | 8/2000 | Suzuki et al. | |
| 6,112,123 A | 8/2000 | Kelleher et al. | |
| 6,135,963 A * | 10/2000 | Haider | 600/447 |
| 6,135,971 A * | 10/2000 | Hutchinson et al. | 601/3 |
| 6,138,513 A * | 10/2000 | Barabash et al. | 73/602 |
| 6,148,224 A * | 11/2000 | Jensen | 600/407 |
| 6,171,248 B1 | 1/2001 | Hossack et al. | |
| 6,176,842 B1 | 1/2001 | Tachibana et al. | |
| 6,183,469 B1 | 2/2001 | Thapilyal et al. | |
| 6,216,704 B1 | 4/2001 | Ingle et al. | |
| 6,217,576 B1 | 4/2001 | Tu et al. | |
| 6,221,018 B1 * | 4/2001 | Ramamurthy et al. | 600/443 |
| 6,231,834 B1 * | 5/2001 | Unger et al. | 424/9.51 |
| 6,361,531 B1 | 3/2002 | Hissong | |
| 6,379,320 B1 | 4/2002 | Lafon et al. | |
| 6,425,867 B1 | 7/2002 | Vaezy et al. | |
| 6,482,178 B1 | 11/2002 | Andrews et al. | |
| 6,508,774 B1 | 1/2003 | Acker et al. | |
| 6,512,957 B1 | 1/2003 | Witte | |
| 6,521,211 B1 | 2/2003 | Unger et al. | |
| 6,533,726 B1 | 3/2003 | Lizzi et al. | |
| 6,546,934 B1 | 4/2003 | Ingle et al. | |
| 6,575,956 B1 * | 6/2003 | Brisken et al. | 604/500 |
| 6,599,245 B1 * | 7/2003 | Ma et al. | 600/437 |
| 6,602,251 B2 | 8/2003 | Burbank et al. | |
| 6,613,004 B1 * | 9/2003 | Vitek et al. | 601/2 |
| 6,618,620 B1 | 9/2003 | Freundlich et al. | |
| 6,626,855 B1 | 9/2003 | Weng et al. | |
| 6,645,202 B1 | 11/2003 | Pless et al. | |
| 6,669,638 B1 * | 12/2003 | Miller et al. | 600/438 |
| 6,716,184 B2 | 4/2004 | Vaezy et al. | |
| 6,719,449 B1 * | 4/2004 | Laugharn et al. | 366/127 |
| 6,719,694 B2 * | 4/2004 | Weng et al. | 600/439 |
| 6,764,488 B1 | 7/2004 | Burbank et al. | |
| 6,770,070 B1 | 8/2004 | Balbierz | |
| 6,783,524 B2 | 8/2004 | Anderson et al. | |
| 6,887,239 B2 * | 5/2005 | Elstrom et al. | 606/41 |
| 6,902,536 B2 | 6/2005 | Manna et al. | |
| 6,921,371 B2 | 7/2005 | Wilson | |
| 6,936,024 B1 | 8/2005 | Houser | |
| 6,936,048 B2 | 8/2005 | Hurst | |
| 6,974,417 B2 * | 12/2005 | Lockwood et al. | 600/459 |
| 7,037,306 B2 | 5/2006 | Podany et al. | |
| 7,063,666 B2 | 6/2006 | Weng et al. | |
| 7,078,015 B2 | 7/2006 | Unger | |
| 2001/0007940 A1 | 7/2001 | Tu et al. | |
| 2001/0014805 A1 | 8/2001 | Burbank et al. | |
| 2001/0037073 A1 | 11/2001 | White et al. | |
| 2002/0065512 A1 | 5/2002 | Fjeld et al. | |
| 2002/0068934 A1 | 6/2002 | Edwards et al. | |
| 2002/0087081 A1 | 7/2002 | Serrano et al. | |
| 2002/0087083 A1 | 7/2002 | Nix et al. | |
| 2002/0111662 A1 | 8/2002 | Iaizzo et al. | |
| 2002/0165579 A1 | 11/2002 | Burbank et al. | |
| 2002/0183742 A1 | 12/2002 | Carmel et al. | |
| 2002/0183771 A1 | 12/2002 | Burbank et al. | |
| 2002/0193781 A1 | 12/2002 | Loeb | |
| 2003/0004434 A1 | 1/2003 | Greco et al. | |
| 2003/0013960 A1 | 1/2003 | Makin et al. | |
| 2003/0013971 A1 | 1/2003 | Makin et al. | |
| 2003/0018266 A1 | 1/2003 | Makin et al. | |
| 2003/0018358 A1 | 1/2003 | Saadat | |
| 2003/0028111 A1 | 2/2003 | Vaezy et al. | |
| 2003/0040698 A1 | 2/2003 | Makin et al. | |
| 2003/0047582 A1 | 3/2003 | Sonnenschein et al. | |
| 2003/0073907 A1 | 4/2003 | Taylor | |
| 2003/0109786 A1 | 6/2003 | Irioka et al. | |
| 2003/0120270 A1 | 6/2003 | Acker | |
| 2003/0144593 A1 | 7/2003 | Whitmore et al. | |
| 2003/0212331 A1 | 11/2003 | Fenton et al. | |
| 2003/0212332 A1 | 11/2003 | Fenton et al. | |
| 2003/0220568 A1 | 11/2003 | Hansmann et al. | |
| 2004/0006336 A1 | 1/2004 | Swanson | |
| 2004/0030268 A1 | 2/2004 | Weng et al. | |
| 2004/0143252 A1 | 7/2004 | Hurst | |
| 2004/0236375 A1 * | 11/2004 | Redding, Jr. | 607/3 |
| 2004/0254570 A1 | 12/2004 | Hadjicostis et al. | |
| 2005/0015107 A1 | 1/2005 | O'Brien | |
| 2005/0085726 A1 | 4/2005 | Lacoste et al. | |
| 2005/0137520 A1 | 6/2005 | Rule et al. | |
| 2005/0228286 A1 | 10/2005 | Messerly et al. | |
| 2005/0240125 A1 | 10/2005 | Makin et al. | |
| 2005/0261585 A1 | 11/2005 | Makin et al. | |
| 2005/0261587 A1 | 11/2005 | Makin et al. | |
| 2005/0261588 A1 | 11/2005 | Makin et al. | |
| 2005/0267488 A1 | 12/2005 | Hare et al. | |
| 2006/0052695 A1 * | 3/2006 | Adam | 600/437 |
| 2006/0052701 A1 | 3/2006 | Carter et al. | |
| 2006/0173348 A1 | 8/2006 | Wilser et al. | |
| 2006/0235306 A1 | 10/2006 | Cotter et al. | |
| 2007/0021691 A1 | 1/2007 | Nita et al. | |
| 2008/0058648 A1 * | 3/2008 | Novak et al. | 600/471 |

OTHER PUBLICATIONS

Billard, et al., "Effects of Physical Parameters in High Temperature Ultrasound Hyperthermia," Ultrasound in Medicine and Biology, vol. 16, Issue 4, pp. 409-420 (1990).

* cited by examiner

TRANSMIT APODIZATION OF AN ULTRASOUND TRANSDUCER ARRAY

FIELD OF THE INVENTION

The present invention relates generally to ultrasound, and more particularly, to an ultrasound medical system having an ultrasound source and an acoustic transducer array.

BACKGROUND OF THE INVENTION

Sound waves that have a frequency greater than approximately 20 kHz are referred to in the art as "ultrasound." In the medical field, ultrasound waves are useful for both diagnostic and therapeutic applications. Medical diagnostic ultrasound systems are useful for generating images of anatomical structures within a target area of a patient's body. The images are obtained by scanning a target area with waves of ultrasound energy. In therapeutic ultrasound applications, high intensity ultrasound energy is transmitted into a target area to induce changes in state of the target. High-intensity focused ultrasound ("HIFU") pulses induce changes in tissue state through thermal effects (e.g., induced hyperthermia) and mechanical effects (e.g., induced cavitation).

The use of high intensity focused ultrasound to destroy tissue or to alter the characteristics of tissue at a target location, volume, region or area within a larger mass, body or area of anatomical tissue presents many advantages, including minimization of trauma and pain for the patient, reductions in surgical incisions, stitches and exposure of internal tissue, avoidance of damage to tissue other than that which is to be treated, altered or removed, lack of a harmful cumulative effect from the ultrasound energy on the surrounding non-target tissue, reduction in treatment costs, elimination of the need in many cases for general anesthesia, reduction of the risk of infection and other complications, avoidance of blood loss, and the ability for high intensity focused ultrasound procedures to be performed in non-hospital sites and/or on an out-patient basis.

In high-intensity focused ultrasound hyperthermia treatments, intensity of ultrasonic waves generated by a highly focused transducer increases from the source to the region of focus where it can reach a very high temperature. The absorption of the ultrasonic energy at the focus induces a sudden temperature rise of tissue, which causes ablation of a target volume of cells in the focal region. Thus, as an example, HIFU hyperthermia treatments can cause necrotization of an internal lesion without damage to the intermediate tissues. The focal region dimensions are referred to as the depth of field, and the distance from the transducer to the center point of the focal region is referred to as the depth of focus. Ultrasound is a promising non-invasive surgical technique because the ultrasonic waves provide a non-effective penetration of intervening tissues, yet with sufficiently low attenuation to deliver energy to a small focal target volume. Currently there is no other known modality that offers noninvasive, deep, localized focusing of non-ionizing radiation for therapeutic purposes. Thus, ultrasonic treatment has a great advantage over microwave and radioactive therapeutic treatment techniques.

The beam emitted by a single ultrasound focused transducer element is generally effective within a fixed region, called the "focal zone." This focal zone frequently is smaller than the size of the target tissue. Treatment of extensive targets is consequently a problem. A solution to this shortcoming is to utilize a transducer comprising a plurality of individual transducer elements arranged closely together to form an array. These arrays are focused at the desired treatment site through a combination geometric and electronic focusing. Geometric focusing is determined by the physical geometry of the array, while electronic focusing involves the use of phase delays and wave interference to achieve constructive interference at the target tissue. Electronic focusing allows movement of the treatment location without the need for mechanical movement of the array.

When a plurality of transducer elements are arranged in an array and are energized to propagate a steerable acoustic beam, the beam includes a main lobe, a plurality of small side lobes and one or more grating lobes. Grating lobes originate from acoustic waves that combine along various axes that differ from the axis of the main lobe. Grating lobes are present in the acoustic beams propagated from nearly all linear arrays and normally contain substantial energy. Side lobes are secondary points of focus outside the treatment region as a result of diffraction of the ultrasound waves passing through a structure, such as tissue or bone. The appearance of grating lobes and side lobes decreases the power radiated to the focal point, reducing the effectiveness of treatment.

It is known in the art to minimize grating lobes and side lobes by transmit apodization, wherein the effective drive amplitude of at least a portion of the elements of an array is varied to affect the shape of the beam. Varying the transmit amplitude at individual elements of the array typically requires the use of variable or switched-rail power supplies or inefficient linear amplifiers at each drive channel. Such drive mechanisms are slow, prohibitively bulky, and costly, particularly considering the large number of array elements present in a typical transducer and the number of element apodization levels necessary for beamshaping.

Pulse width variation has previously been considered for transmit apodization in association with ultrasound imaging, such as in U.S. Pat. No. 6,135,963 to Haider and U.S. Pat. No. 6,599,245 to Ma et al. As is well-known in the art, a relatively short transmit pulse is preferable for imaging, and a single pulse is often used. If a single pulse is apodized by adjusting its width, the frequency spectrum of the electrical signal supplied to the transducer to generate a corresponding ultrasound signal will likewise be significantly modified. Thus, if various transmit apodization pulse widths are applied to different array elements, the focusing, frequency spectrum and effective amplitude of the aggregate ultrasonic treatment signal emitted by the transducer will vary. This may result in undesired effects. For example, ultrasound array elements typically have limited bandwidth so there is a severe limit to the amount of useful apodization that is possible. In addition, if the transmit waveshapes are different between elements of an array, the aggregated ultrasound signals of the elements do not efficiently form a focused beam. Also, any electrical matching required to couple the electrical signal to a transducer element can drastically alter the transmit pulse shape. As a result, apodization is of limited value for ultrasound imaging.

The desired characteristics of transmit apodization of ultrasound signals for therapeutic purposes differs considerably from signals transmitted for imaging. In particular, therapeutic transducers transmit an ultrasonic pulse train for a relatively long period of time. As a result, the center of the frequency spectrum is retained generally at the pulse repetition frequency of the pulse train and is not "pulled," rolled-off or skewed as with a transient pulse or a pulse train of short duration. If the width of the repeating pulses is short, such as a repeating pulse train of narrow spikes, the frequency spectrum broadens out and decreases in amplitude, but the peak of the spectrum remains at the pulse repetition frequency. Likewise, as the duty cycle of the pulse train increases towards a symmetrical shape (i.e., approximately equal times in "high" and "low" logical states) the effective amplitude of an array element increases. As a result of these characteristics, transmit apodization of ultrasound signals in the manner known for imaging will not produce satisfactory results when applied to therapeutic ultrasound signals.

Still, scientists and engineers continue to seek improved ultrasound medical systems. There is a need for a more efficient way to achieve transmit apodization of therapeutic ultrasound transducers.

SUMMARY OF THE INVENTION

A system for temporal transmit apodization of an ultrasound transducer array is disclosed according to an embodiment of the present invention. The system includes a waveform generator and an ultrasound transducer array having a plurality of transducer elements.

The waveform generator includes a plurality of signal generators, each coupled to an associated duty cycle control. The signal generators each produce an electrical signal having a period, amplitude and impedance compatible with the transducer elements. The duty cycle controls are each adapted to set the duty cycle of an associated signal generator.

The ultrasound transducer array may be arranged in a pattern of concentric circles. Alternatively, a plurality of elements may be arranged linearly for subdermal insertion with a minimum of trauma to surrounding tissue.

The duty cycle of each signal generator is determined by a predetermined setting of a duty cycle control. The duty cycle of each signal generator is calculated to achieve a desired beam profile of the transducer array, such as acoustic focusing for reducing the level of grating lobes and side lobes. Apodization is achieved by varying the effective amplitude at each array element by varying the duty cycle of the signal provided to each element, rather than using variable or switched-rail power supplies, or linear amplifiers. As a result, apodization can be accomplished efficiently by digital means, using components having less complexity than commonly found with analog ultrasound systems.

DETAILED DESCRIPTION OF THE INVENTION

Figure 1:
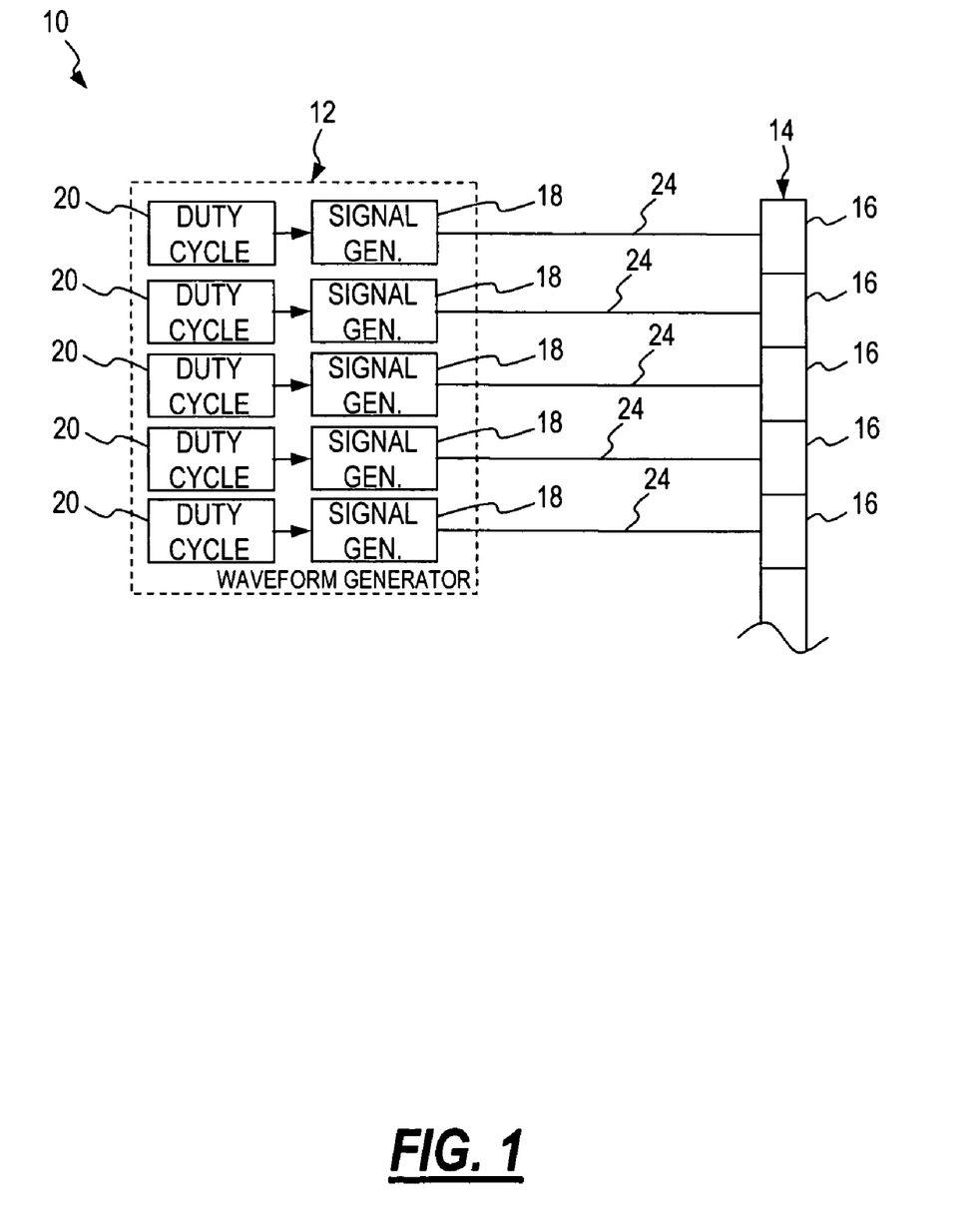
FIG. 1 is a block diagram of an ultrasound transmission system for therapeutic treatment according to an embodiment of the present invention.

A system 10 for temporal transmit apodization of an ultrasound transducer array is shown in FIG. 1 according to an embodiment of the present invention. System 10 includes a waveform generator 12 and an ultrasound transducer array 14.

Transducer 14 may be any conventional type of ultrasound transducer having a plurality of transducer elements 16 that may be focused by any conventional geometric and electronic focusing means. For example, elements 16 may be arranged in a pattern of concentric circles. Alternatively, a plurality of elements 16 may be arranged linearly for subdermal insertion with a minimum of trauma to surrounding tissue.

Waveform generator 12 includes a plurality of signal generators 18, each coupled to an associated duty cycle control 20. Signal generators 18 each produce a digital, generally square-wave electrical signal having a period, amplitude and impedance compatible with elements 16 of transducer 14. Duty cycle controls 20 each are adapted to set the duty cycle of an associated signal generator 18. The drive signals produced by signal generators 18 are coupled to associated elements 16 of transducer 14 by any conventional means, such as wires 22. Although separate signal generators 18 and duty cycle controls 20 are depicted in FIG. 1, one skilled in the art will recognize that a fewer number of signal generators and/or duty cycle controls may be utilized and controlled in any conventional manner to provide electrical signals of varying duty cycles to each transducer element 16. In addition, although not shown, conventional signal conditioning may be applied to the electrical signals generated by signal generators 18 including, without limitation, filters such as bandpass filters and digital signal processors.

Figure 2:
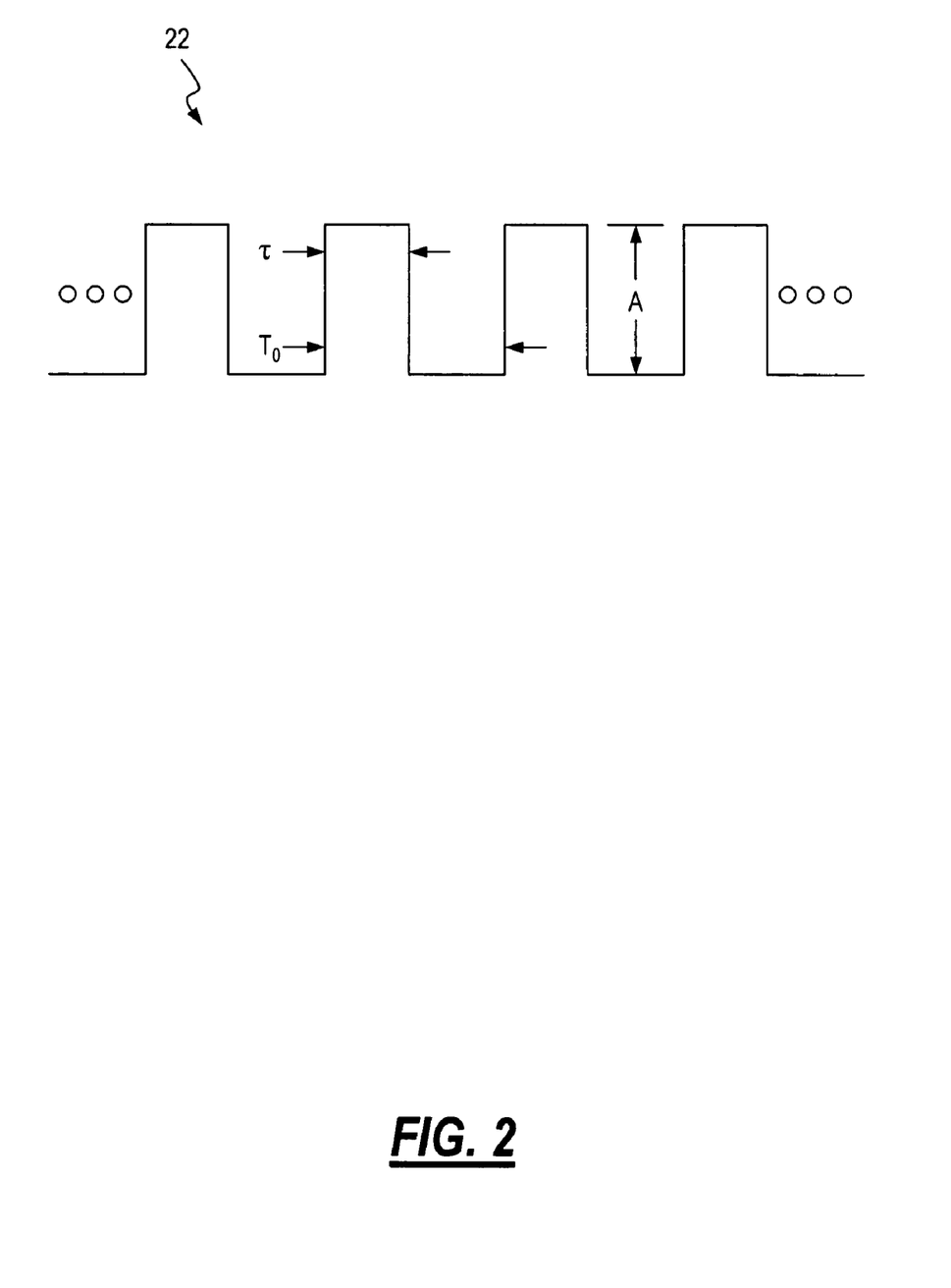
FIG. 2 depicts a periodic pulse train generated by the system of FIG. 1.

With continued reference to FIG. 1, a drive signal pulse train 22 is a periodic rectangular waveform. Pulse train 22 is coupled to transducer elements 16 by signal generators 18 as shown in FIG. 2. Pulse train 22 has an amplitude A, a period $T_0$ and a pulse width $\tau$. Pulse train 22 thus has a duty cycle of $\tau/T_0$. Elements 16 can be driven by pulse train 22, each element being driven with signals having a like amplitude "A" but different duty cycles. The frequency spectrum, G(f), of pulse train 22 may be represented by Equation 1:

$$G(f) = \frac{1}{T_0} \sum_{n=-\infty}^{n=\infty} A\tau \frac{\sin\left(\pi n \frac{\tau}{T_0}\right)}{\pi n \frac{\tau}{T_0}} \delta\left(f - \frac{n}{T_0}\right) \quad \text{Equation 1}$$

where n is a term coefficient of the series of pulses in pulse train 22, $\delta$ represents the delta function and f is the frequency of the pulse train.

At the fundamental frequency of pulse train 22, $$f = f_0 = \frac{1}{T_0},$$

and n=1 such that the spectral amplitude of the pulse train is given by Equation 2:

$$G(f_0) = \frac{A}{\pi} \sin\left(\pi \frac{\tau}{T_0}\right) \quad \text{Equation 2}$$

Figure 3:
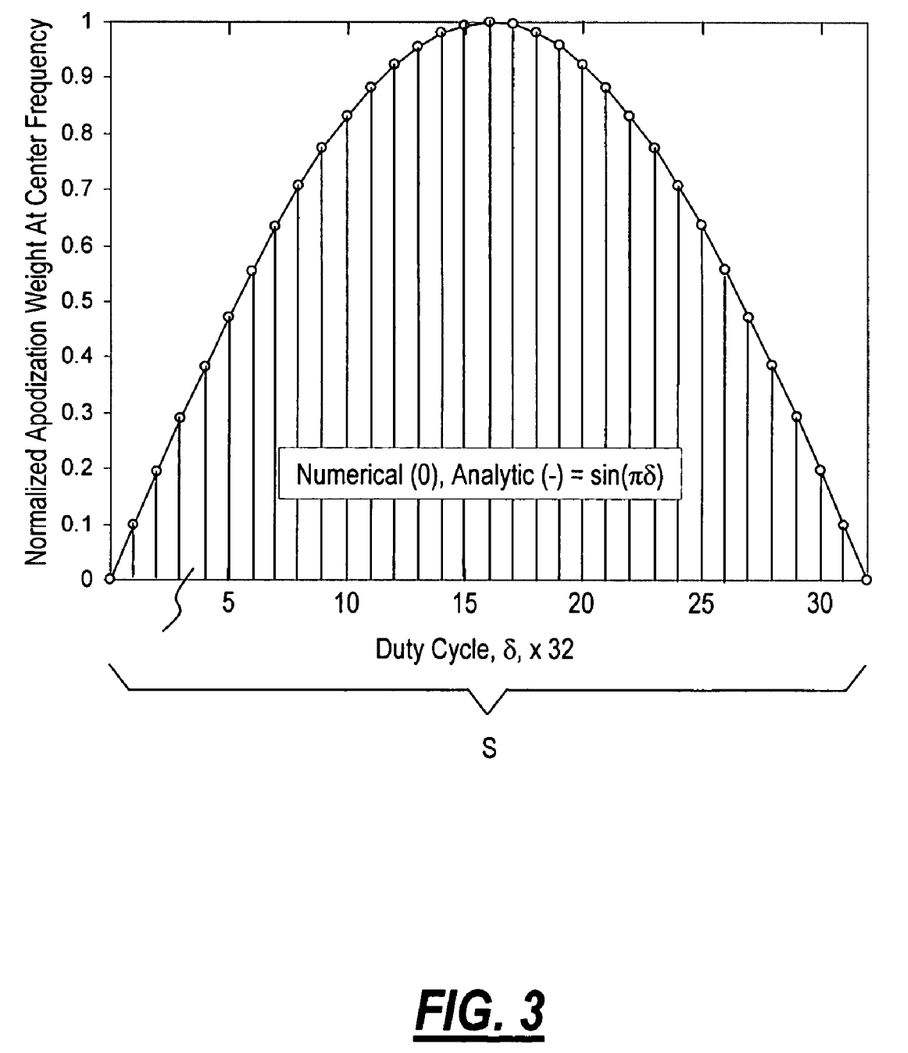
FIG. 3 shows the representation of apodization weights versus duty cycle of the periodic pulse train of FIG. 2.

By varying the duty cycle $\tau/T_0$ between 0 and 50% the effective spectral amplitude $G(f_0)$ varies between normalized values of 0 and 1, as shown in FIG. 3. This variation may be used to weight, or apodize, the transmit amplitude of an array element 16 during therapy.

With reference to FIG. 3 in combination with FIG. 2, the period $T_0$ may be divided into a plurality of segments "S" of equal duration. The number of segments of period $T_0$ are preferably any value $2^x$, where x is zero or any positive integer. For example, if x=5, the number of segments is 32. The duty cycle of a pulse train 22 divided into 32 segments may be varied between $0/32$ or 0%, and $32/32$ or 100%. For the nontrivial case of 1/32 to 31/32, the spectral amplitude of pulse train 22 may vary in the form of $\sin(\pi\delta)$ where $\delta$ now represents the duty cycle, $\delta=(1 \text{ to } 31)/32$. The apodization rises from zero at zero duty cycle to unity at 50% duty cycle, and drops off toward zero for greater duty cycles.

If an even number of segments exist, such as a period dividable into N pulse widths, then $$\frac{N}{2}+1$$

unique levels of apodization exist. An apodization of zero equates to an off element 20, while an apodization of 1 indicates a fully-on element. A total of N/2 segments may thus be used to control an element 20 between the fully-off and fully-on states. For N=32, pulse widths ranging from 0/32 to 16/32 are possible.

Example apodization levels are tabulated of the period $T_0$ where the number of segments "S" is 16 in Table 1.

TABLE 1

Temporal Weighting, 16 Segments

| Duty Cycle | Weight | [dB] |
|---|---|---|
| 8/16 | 1.000 | 0.00 |
| 7/16 | 0.976 | −0.22 |
| 6/16 | 0.917 | −0.75 |
| 5/16 | 0.826 | −1.66 |
| 4/16 | 0.706 | −3.03 |
| 3/16 | 0.534 | −5.45 |
| 2/16 | 0.366 | −8.74 |
| 1/16 | 0.185 | −14.68 |

Example apodization levels for a period $T_0$ where the number of segments "S" is 32 is shown in Table 2:

TABLE 2

Temporal Weighting, 32 Segments

| Duty Cycle | Weight | [dB] |
|---|---|---|
| 16/32 | 1.000 | 0.00 |
| 15/32 | 0.992 | −0.07 |
| 14/32 | 0.976 | −0.22 |
| 13/32 | 0.951 | −0.44 |
| 12/32 | 0.917 | −.075 |
| 11/32 | 0.875 | −1.16 |
| 10/32 | 0.826 | −1.66 |
| 9/32 | 0.769 | −2.28 |
| 8/32 | 0.706 | −3.03 |
| 7/32 | 0.611 | −4.28 |
| 6/32 | 0.534 | −5.45 |
| 5/32 | 0.452 | −6.90 |
| 4/32 | 0.366 | −8.74 |
| 3/32 | 0.276 | −11.17 |
| 2/32 | 0.185 | −14.68 |
| 1/32 | 0.092 | −20.73 |

With reference to FIGS. 1-3 in combination, in operation each of transducer elements 16 are driven by a signal generator 18 that generates a drive signal similar to that of FIG. 2. The duty cycle of each signal generator 18 is determined by a predetermined setting of a duty cycle control 20. The duty cycle of each signal generator 18 is preferably calculated to achieve a desired beam profile of transducer array 14, such as acoustic focusing for reducing the level of grating lobes and side lobes. Apodization is achieved by varying the effective amplitude at each array element 16 by varying the duty cycle of the signal provided to each element, rather than using variable or switched-rail power supplies, or linear amplifiers. As a result, apodization can be accomplished efficiently by digital signal generation and control means, using components having less complexity than commonly found with analog ultrasound systems. Example digital signal generation means include, without limitation, digital waveform generators, pulse width modulators and semiconductors power switching devices such as, without limitation, bipolar transistors and MOSFETs. Example digital control means include, without limitation, microprocessors, microcontrollers, computers, and predetermined instructions such as computer programs.

Figure 4:
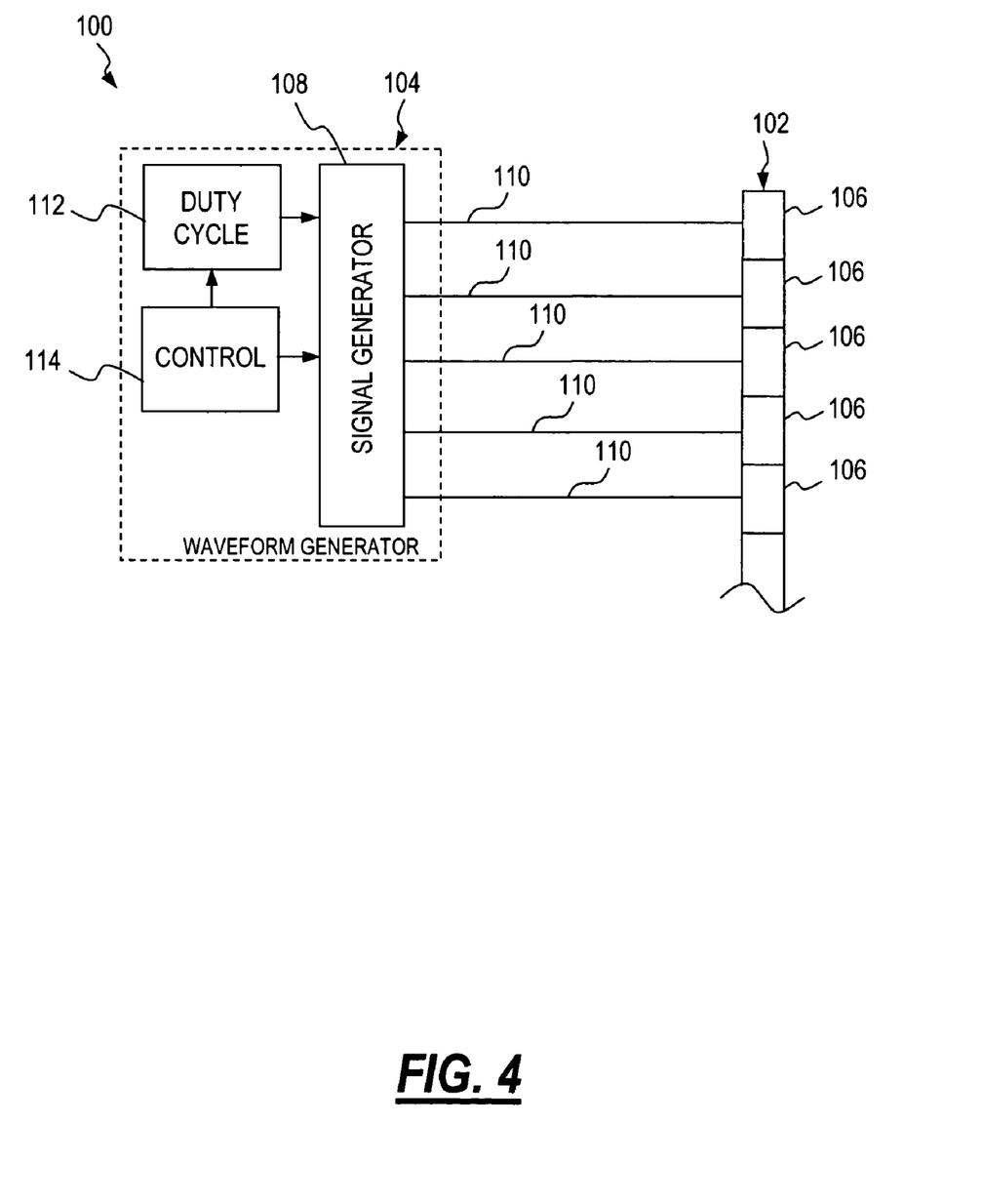
FIG. 4 is a block diagram of an ultrasound transmission system for therapeutic treatment according to an alternate embodiment of the present invention.

An alternate embodiment of the present invention, shown in FIG. 4, illustrates how the present invention may be used with a single signal generator and duty cycle control. In this implementation a system 100 for temporal transmit apodization of an ultrasound transducer array includes a transducer array 102 and a waveform generator 104.

Transducer array 102 may be any conventional type of ultrasound transducer having a plurality of transducer elements 106 that may be focused by any conventional geometric and electronic focusing means. For example, elements 106 may be arranged in a pattern of concentric circles. Alternatively, a plurality of elements 106 may be arranged linearly for subdermal insertion with a minimum of trauma to surrounding tissue.

Waveform generator 104 includes a signal generator 108 having multiple outputs 110, each output coupled to an array element 106. Signal generator 108 produces at each output 110 a digital, generally square-wave electrical signal having a period, amplitude and impedance compatible with elements 106 of transducer 102. A duty cycle control 112 is adapted to provide at least one duty cycle control signal to signal generator 108 for individually controlling the duty cycle of the signals present at outputs 110. A control 114 may utilize a processor (not shown) such as a microprocessor and a predetermined set of instructions, such as a computer program (not shown), to determine the proper duty cycle for each element 106. In one embodiment, duty cycle instructions may be provided to duty cycle control 112. Duty cycle control 112 in turn provides signal generator 108 with information regarding the required duty cycle for each output 110. Alternatively, duty cycle information for each output 110 may be stored in a conventional data memory (not shown) such as a static RAM or flash memory. The data memory may be located within duty cycle control 112 or signal generator 108.

With reference to FIGS. 2, 3 and 4 in combination, in operation each element 106 of a transducer array 104 are driven by a signal generator 108 that generates a plurality of output drive signals 110 similar to that of FIG. 2. The duty cycle of each output signal 110 is determined by a predetermined setting of a duty cycle control 112. The predetermined setting may be provided to at least one of signal generator 108 and duty cycle control 112 by a control portion 114. The duty cycle of each output 110 is preferably calculated to achieve a desired beam profile of transducer array 104, such as acoustic focusing for reducing the level of grating lobes and side lobes.

Apodization of array elements 106 is achieved by varying the effective amplitude at each element by varying the duty cycle of the signal provided to each element, rather than using variable or switched-rail power supplies, or linear amplifiers. As a result, apodization can be accomplished efficiently by digital means, using components having less complexity than commonly found with analog ultrasound systems. Example digital signal generation means include, without limitation, digital waveform generators, pulse width modulators and semiconductors power switching devices such as, without limitation, bipolar transistors and MOSFETs. Example digital control means include, without limitation, microprocessors, microcontrollers, computers, and predetermined instructions such as computer programs. In addition, a single signal generator and duty cycle control of the system 100 depicted in FIG. 4 requires fewer components as compared to the system 10 of FIG. 1.

System 100 provides several features, such as programmability of elements 106 duty cycles for varying conditions and needs. For example, the duty cycle may be varied in response to a feedback signal (not shown) indicating a need for a change in the electronic focus of transducer array 102 or the effective amplitude of the ultrasound signal emitted by the transducer array. Control 114 may respond to the change requirement by adjusting the duty cycle of each transducer element 106 in a predetermined manner to accomplish the change.

While the present invention has been illustrated by a description of several embodiments, it is not the intention of the applicants to restrict or limit the spirit and scope of the appended claims to such detail. Numerous other variations, changes, and substitutions will occur to those skilled in the art without departing from the scope of the invention. For instance, the ultrasound medical system of the invention has application in ultrasound imaging and robotic assisted surgery taking into account the obvious modifications of such systems, components and methods to be compatible with such a imaging and robotic systems. It will be understood that the foregoing description is provided by way of example, and that other modifications may occur to those skilled in the art without departing from the scope and spirit of the appended claims.

What is claimed is:

1. A system for generating a therapeutic ultrasound signal, comprising:
   a medical-treatment transducer array having a plurality of transducer elements, each element being adapted to convert a periodic electrical signal to an ultrasound signal; and
   a waveform generator coupled to at least one transducer element and including:
       at least one signal generator adapted to transmit a periodic electrical signal to the transducer element, and
       at least one duty cycle control adapted to control the duty cycle of the periodic electrical signal of an associated signal generator,
   wherein the duty cycle of the periodic electrical signal is associated with a plurality of weighted apodization levels derived by dividing the period of the periodic electrical signal into a plurality of equal segments, and
   wherein each of at least a plurality of the transducer elements emit ultrasound signals having a different effective amplitude from each other of the plurality of the transducer elements in accordance with the duty cycle of an associated periodic electrical signal, such that the transducer array emits an apodized therapeutic ultrasound signal.

2. The system of claim 1 wherein:
   each transducer element is separately coupled to one of a plurality of signal generators;
   each signal generator is coupled to one of a plurality of duty cycle controls; and
   each duty cycle control is adapted control the duty cycle of an associated signal generator such that each signal generator generates a predetermined periodic electrical signal.

3. The system of claim 1 wherein the periodic electrical signal to the transducer element is a rectangular waveform.

4. The system of claim 1 wherein the apodized ultrasound signal is tailored to reduce the level of grating lobes and side lobes.

5. A method for generating a therapeutic ultrasound signal, comprising the steps of:
   providing a medical-treatment transducer array having a plurality of transducer elements, each element being adapted to convert a periodic electrical signal to an ultrasound signal;
   coupling to at least one transducer element a waveform generator having:
       at least one signal generator adapted to generate and transmit a periodic electrical signal to the transducer element, and
       at least one duty cycle control adapted to control the duty cycle of the periodic electrical signal of an associated signal generator; and
   associating the duty cycle of the periodic electrical signal with a plurality of weighted apodization levels derived by dividing the period of the periodic electrical signal into a plurality of equal segments,
   wherein each of at least a portion of the transducer elements emit ultrasound signals having a different effective amplitude from each other of the portion of the transducer elements in accordance with the duty cycle of an associated periodic electrical signal, such that the transducer array emits an apodized therapeutic ultrasound signal.

6. The method of claim 5, further comprising the steps of:
   separately coupling one of a plurality of signal generators to each transducer element;
   separately coupling one of a plurality of duty cycle controls to each signal generator; and
   wherein each duty cycle control is adapted control the duty cycle of an associated signal generator such that each signal generator generates a predetermined periodic electrical signal.

7. The method of claim 5, further comprising the step of providing a rectangular periodic electrical signal to the transducer element.

8. The method of claim 5, further comprising the step of tailoring the apodized ultrasound signal to reduce the level of grating lobes and side lobes.

9. A system for generating a therapeutic ultrasound signal, comprising:
   a medical-treatment transducer array having a plurality of transducer elements, each element being adapted to convert a periodic electrical signal to an ultrasound signal; and
   a waveform generator coupled to at least one transducer element, including:
       a signal generator adapted to generate and transmit a plurality of periodic electrical signals to the transducer elements by means of a plurality of outputs,
       a duty cycle control adapted to control the duty cycle of the periodic electrical signals generated by the signal generator, and
       a control portion adapted to control at least one of the duty cycle control and the signal generator;
   wherein the duty cycle of the periodic electrical signal is associated with a plurality of weighted apodization levels derived by dividing the period of the periodic electrical signal into a plurality of equal segments, and wherein each of at least a portion of the transducer elements emit ultrasound signals having a different effective amplitude from each other of the portion of the transducer elements in accordance with the duty cycle of an associated periodic electrical signal, such that the transducer array emits an apodized therapeutic ultrasound signal.

10. The system of claim 9 wherein the control portion is a digital control.

11. The system of claim 9 wherein the periodic electrical signal to the transducer elements is a rectangular waveform.

12. The system of claim 9 wherein the apodized ultrasound signal is tailored to reduce the level of grating lobes and side lobes.

13. A method for generating a therapeutic ultrasound signal, comprising the steps of:

providing a medical-treatment transducer array having a plurality of transducer elements, each element being adapted to convert a periodic electrical signal to an ultrasound signal; and coupling to at least one transducer element a waveform generator having:

a signal generator adapted to generate and transmit a periodic electrical signal to the transducer element, a duty cycle control adapted to control the duty cycle of the periodic electrical signal of an associated signal generator, and a control portion adapted to control at least one of the duty cycle control and the signal generator; and associating the duty cycle of the periodic electrical signal with a plurality of weighted apodization levels derived by dividing the period of the periodic electrical signal into a plurality of equal segments, wherein each of at least a portion of the transducer elements emit ultrasound signals having a different effective amplitude from each other of the portion of the transducer elements in accordance with the duty cycle of an associated periodic electrical signal, such that the transducer array emits an apodized therapeutic ultrasound signal.

14. The method of claim 13, further comprising the step of providing a digital control.

15. The method of claim 13, further comprising the step of providing a rectangular periodic electrical signal to the transducer element.

16. The method of claim 13, further comprising the step of tailoring the apodized ultrasound signal to reduce the level of grating lobes and side lobes.

* * * * *